United States Patent
Sabin et al.

(10) Patent No.: US 7,517,480 B2
(45) Date of Patent: Apr. 14, 2009

(54) AUTOMATIC PROCESS CONTROL FOR A MULTILAYER INJECTION MOLDING APPARATUS

(75) Inventors: Douglas Sabin, Marblehead, MA (US); Paul Swenson, South Hamilton, MA (US)

(73) Assignee: Kortec, Inc., Ipswich, MA (US)

( * ) Notice: Subject to any disclaimer, the term of this patent is extended or adjusted under 35 U.S.C. 154(b) by 729 days.

(21) Appl. No.: 10/920,725

(22) Filed: Aug. 18, 2004

(65) Prior Publication Data

US 2005/0082707 A1 Apr. 21, 2005

Related U.S. Application Data

(60) Provisional application No. 60/496,094, filed on Aug. 18, 2003.

(51) Int. Cl.
B29C 45/76 (2006.01)
(52) U.S. Cl. .................. 264/40.1; 700/200; 264/40.6; 425/144; 425/172
(58) Field of Classification Search ............... 264/40.1, 264/40.6; 425/139, 165, 169, 171, 172, 140, 425/144, 166; 700/200, 202
See application file for complete search history.

(56) References Cited

U.S. PATENT DOCUMENTS

| | | | | |
|---|---|---|---|---|
| 5,049,750 A | * | 9/1991 | Hoshino et al. | 250/341.1 |
| 5,135,377 A | * | 8/1992 | Gellert | 425/130 |
| 5,143,733 A | * | 9/1992 | Von Buren et al. | 425/130 |
| 5,232,710 A | * | 8/1993 | Miyazawa et al. | 425/130 |
| 5,518,389 A | * | 5/1996 | Nonomura et al. | 425/144 |
| 5,914,138 A | | 6/1999 | Swenson | |
| 6,878,316 B1 | * | 4/2005 | Cochran et al. | 264/40.1 |
| 2002/0192404 A1 | | 12/2002 | Swenson | |
| 2003/0080452 A1 | * | 5/2003 | Bulgrin et al. | 264/40.1 |

FOREIGN PATENT DOCUMENTS

| | | | |
|---|---|---|---|
| EP | 698468 | * | 2/1996 |
| EP | 1034910 | | 9/2000 |
| EP | 1166994 | | 1/2002 |
| EP | 1270092 | | 1/2003 |
| JP | 1072822 | | 3/1989 |
| JP | 03105238 | | 5/1991 |
| JP | 09174602 | | 7/1997 |
| JP | 09174603 | | 7/1997 |
| JP | 10272663 | | 10/1998 |
| JP | 11042672 | | 2/1999 |

(Continued)

OTHER PUBLICATIONS 11-207,777, Aug. 3, 1999, Japanese reference electronic translation.*

(Continued)

Primary Examiner—Jill L Heitbrink
(74) Attorney, Agent, or Firm—Lowrie, Lando & Anastasi, LLP.

(57) ABSTRACT

A control system for use with a multi-layer molding device having an inspection device for measuring a characteristic of a product of a cavity of the molding device and a controller adapted to receive information corresponding to the at least one characteristic from the inspection device and to alter the molding device based on the information.

46 Claims, 7 Drawing Sheets

FOREIGN PATENT DOCUMENTS

| | | |
|---|---|---|
| JP | 11042673 | 2/1999 |
| JP | 11042683 | 2/1999 |
| JP | 11207777 | 8/1999 |
| WO | WO 00/61350 | 10/2000 |
| WO | WO 2004/043671 | 5/2004 |

OTHER PUBLICATIONS

Lehmann P, "Messung Und Regelung Von Produkteigenschaften" Plastverarbeiter, Zechner Und Huethig Verlag Gmbh, Speyer/Rhein, DE, vol. 36, No. 10, Oct. 1985, pp. 132, 134.

* cited by examiner $$\begin{bmatrix} A_{N_1,P_1} & \cdots & A_{N_n,P_1} \\ \vdots & & \vdots \\ \vdots & \cdot & A_{N_i,P_j} \\ \vdots & & \\ A_{N_1,P_n} & & \end{bmatrix} \begin{bmatrix} x_1 \end{bmatrix} = \begin{bmatrix} b_1 \end{bmatrix}$$

*FIG. 5*

AUTOMATIC PROCESS CONTROL FOR A MULTILAYER INJECTION MOLDING APPARATUS

RELATED APPLICATIONS

This application claims priority under 35 U.S.C. § 119(e) to U.S. Provisional Application Ser. No. 60/496,094, entitled "MULTILAYER INJECTION MOLDING APPARATUS HAVING AUTOMATIC PROCESS CONTROL," filed on Aug. 18, 2003, which is herein incorporated by reference in its entirety.

BACKGROUND OF INVENTION

1. Field of Invention

The present invention is directed to multilayer injection molding apparatus, and more particularly, to multilayer injection molding apparatus having automatic process control.

2. Discussion of Related Art

Multilayer injection molding apparatus produce, for example, products that include at least one core (interior) layer and two skin (encapsulating) layers. The position of a core layer leading edge (i.e., the edges that are first injected) and the shape of the core layer in such a multilayer molded product is controlled, for example, by the amount of inner and outer skin layer material that is injected into the cavity before the core layer material begins to flow into the same cavity, and the volumetric flow rate of the materials.

One example of such a multilayer product is a blow molding preform. In such preforms, the position and shape of the core layer at least partially determines the performance of a subsequently formed blow-molded part. For example, the position and shape of the core may determine the gas permeability of the blow-molded part.

In multi-cavity, multilayer injection molding devices, the positions of the leading edges of the core layers of products produced in each of the cavities are preferably located within a predetermined range relative to the skin layer leading edge.

Conventionally known injection molding techniques suitable for controlling placement and quality of materials in multilayer products include thermally-balanced flow techniques and shooting pot techniques. In systems employing thermally-balanced techniques, the amount and timing of the introduction of the core materials and skin materials into the cavities are partially controlled by controlling the temperature of the skin material flow channels to a particular cavity relative to the skin material flow channels to the rest of the cavities, so that a suitable flow rate and volume of skin material flows into each cavity before injection of the core material begins. By contrast, in systems employing shooting pot techniques, shooting pots are used to determine the volume of core material and skin material fed into each cavity or group of cavities fed by that particular shooting pot. In injection molding apparatus employing shooting pots, the volumetric stroke in one or more skin shooting pots will alter the position of the leading edge in one or more cavities, and changing the volumetric stroke in all skin shooting pots will alter the position in all cavities.

Conventionally, the parameters in both thermally-balanced systems and shooting pot systems are set manually. That is, the molded products produced by each mold cavity are manually inspected (e.g., by cutting a cross section of a molded product) to determine the position of the leading edge. If the leading edge is not in the desired position, the machine operator adjusts parameters of the injection molding apparatus to bring the leading edge into a proper location. Setting the parameters is typically performed at the start of a molding run and whenever inspection of the molded products indicates that a molded product is outside of the predetermined acceptable range.

For example, in a thermally-balanced molding device producing a three-layer molded product, the parameters adjusted to achieve an acceptable leading edge position may include the temperatures of one or more of the nozzles that are used to inject the core material and the skin layer into the cavities of a mold, and may also include the start time of the injection of the core layer into the mold relative to the skin injection, such that the position of the leading edge of the core material in all cavities is affected.

An adjustment process typically takes several iterations, because an adjustment affecting a first cavity may have a secondary effect on surrounding cavities. The adjustments may take several hours for a skilled engineer and may take much longer for a less experienced operator. For the less skilled operators, a lack of understanding of the interaction of the process variables may even prevent them from successfully placing the leading edge in the desired position.

Once set, the leading edge position may be repeatably produced until some perturbation of the system occurs. Such perturbations may include, for example, changes in material properties due to the use of different lots of production of the core layer and/or skin layer materials, or changes in the moisture content of the materials, or changes in chilled water or tower water caused by diurnal changes in ambient air temperatures. Other perturbations may be caused by starting up or shutting down other machines in the plant that share the same utilities as the affected injection molding apparatus, or by perturbations in the auxiliary equipment used to dry the skin or core materials prior to molding, or by changes in temperature of a hydraulic fluid which may be used, for example, in the apparatus that injects mold material into the cavities of a mold. It is to be appreciated, that although monitoring of machine parameters and auxiliary equipment detects many perturbations, and allows them to be corrected by the machine operator, there are occasionally subtle perturbations that individually are small but which combine together to affect the leading edge position in a molded product, despite failing to exceed the "alarm limit" for any individual machine parameter.

Once an injection molding system is producing products having a leading edge in an acceptable location, the leading edge position is typically manually inspected on a continuous SPC (statistical process control) basis to determine if process adjustments are required. If the perturbations are minor, the leading edge may be stable within an acceptable range for days at a time, but if the perturbations are larger or the acceptable position range is selected to be narrow, the leading edge may require monitoring several times a day and appropriate machine adjustment may be performed as required.

Conventionally, injection molding machines suitable for producing blow molding performs have had forty-eight cavities. In an effort to increase the machine output per capital equipment cost to produce preforms, there is a desire to increase the number of cavities in molds, for example, to 144 cavities. As the number of cavities in multilayer molding systems has increased, the manual inspection, adjustment times and production rates have increased. Even with the use of robotically-fed ultrasonic or optical measurement systems, full inspection and measurement of a forty-eight cavity molding apparatus typically requires about one man-hour, and subsequent adjustment of the machine parameters or auxiliary equipment typically requires an additional hour. Of course, after such adjustments, SPC protocol requires more frequent inspection until a history of stability is reestablished.

With the introduction of higher cavitation systems such as 144-cavity systems, the manual inspection time is increased approximately threefold relative to forty-eight cavity systems. The amount of unqualified preforms produced during periods of adjustment is likewise increased as result of the increased adjustment time and the increased production rate. For example, in thermally balanced apparatus, during the first startup of a 144-cavity system, many tens of thousands of scrap parts may be manufactured at a significant cost.

SUMMARY OF INVENTION

Aspects of the present invention are directed to a control system capable of automatically measuring characteristics of molded products from a multilayer injection molding device (e.g., position of a core leading edge, thickness of the core, permeability of the product to gas or light), and providing information to a controller which automatically makes parameter adjustments to achieve products having characteristics in an acceptable range.

Other aspects of the invention are directed to multilayer injection molding devices having automatic acceptance/rejection mechanisms, such that unacceptable products may be identified and/or discarded.

Yet other aspects of the invention are directed to a multilayer injection molding device capable of automatically shutting down a cavity (e.g., by reducing the temperature of the nozzle feeding the cavity) of a multicavity injection molding apparatus and adjusting parameters of the apparatus, such that selected characteristics (also referred to herein as features) of molded products from the remaining cavities are within a selected range.

A first aspect of the invention is directed to a control system for use with a multilayer molding device having at least one cavity, comprising: a first inspection device adapted to measure at least one characteristic of a first multi-layer molded product from a first cavity of the at least one cavity; and a controller configured and arranged to receive information corresponding to the at least one characteristic and to modify the molding device in response to the information, whereby at least one characteristic of a second product produced after modification is different than it would have been before the modification.

In some embodiments, the first product and the second product are from the same cavity. The controller may be adapted to be coupled to a hot half of the at least one cavity and to control a temperature of the hot half, whereby the at least one characteristic of the second product is altered.

In some embodiments, the hot half comprises at least a first nozzle, and wherein the controller is adapted to control a temperature of the first nozzle. In some embodiments, the hot half comprises at least one block which is thermally coupled to a plurality of nozzles, and wherein the controller is adapted to control a temperature of the at least one block.

Optionally, the control system may further comprise a temperature controller coupled intermediate to the controller and the hot half to control the temperature of the hot half. In some embodiments, the molding device includes an injection apparatus adapted to inject a material into the at least one cavity and wherein the controller is adapted to be coupled to the injection apparatus. In some embodiments, the injection apparatus includes an injection screw and wherein the controller is adapted to control the injection screw. In some embodiments, the controller is adapted to control at least one of a temperature of the injection apparatus, timing of injection of the material, rate at which the material is injected and pressure at which the material is injected. In some embodiments, the control system is adapted for use with a thermally-balanced molding device, and in other embodiments, the control system is adapted for use with a shooting pot-based molding device.

In some embodiments, the characteristic of the first multi-layer molded product includes a characteristic of a core layer. The characteristic of the core layer may be, for example, one of a location of the core layer, and presence of the core layer. The first inspection device may be, for example, one of an optical device, an ultrasound device and a magnetic resonance imaging device.

In some embodiments, the control system further comprises a second inspection device adapted to measure at least one characteristic of a third multi-layer molded product. Optionally, the at least one cavity comprises the first cavity and a second cavity, and the control system is adapted such that the first inspection device measures molded products from the first cavity and the second inspection device measures molded products from the second cavity.

The control systems may comprise a rejection device coupled to the controller device, and the controller may be adapted to activate the rejection device if the first product is determined to be outside of a specification or a selected level of uncertainty as to the quality of the product is determined. The rejection device may be adapted to physically alter the first product if the first product is determined to be outside of the specification. In some embodiments, the rejection device is adapted to physically move the first product if the first product is determined to be outside of the specification.

The information may correspond to at least one characteristic of a plurality of multi-layer molded products, the first product constituting one of said plurality. The second product may be from the first cavity and the controller may be configured and arranged to control at least one characteristic of a third product from a second cavity of the at least one cavity in response to the information, the first cavity and the second cavity being different cavities.

The controller may be configured and arranged to control the at least one characteristic of the second product and the at least one characteristic of the third product in response to an affect matrix applied to the information. In some embodiments, the controller is configured to indicate to an operator that, based on the information, a selected action is to be taken by the operator. The control system may further comprise a cavity operatively coupled to a second nozzle, wherein the controller is configured to shut down the second cavity based on the information and to modify the temperature in response to said shut down.

A first aspect of the invention is directed to a method of operating a multilayer molding device having at least one cavity, comprising: measuring at least one characteristic of a first multi-layer molded product from a first cavity of the at least one cavity; modifying the molding device in response to the at least one characteristic; after said step of modifying, producing a second product, whereby the second product is substantially different than it would have been before the step of modifying.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIG. 5 illustrates an exemplary affect matrix which may be used by a calculation module (shown in FIG. 1) to automatically control and injection mold apparatus;

DETAILED DESCRIPTION

Figure 1:
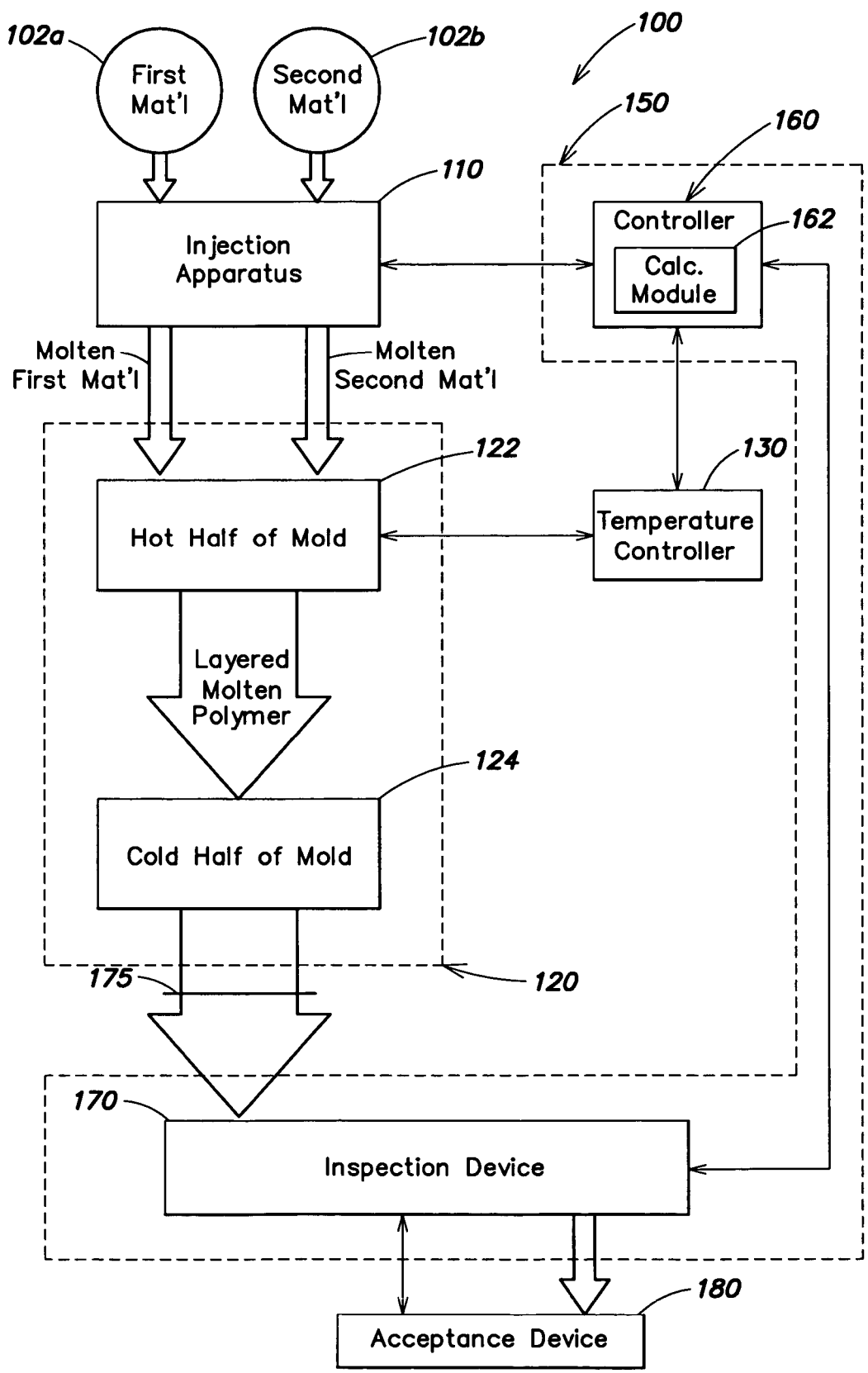
FIG. 1 is a block diagram of an exemplary multilayer injection molding device according to aspects of the present invention.

This invention is not limited in its application to the details of construction and the arrangement of components set forth in the following description or illustrated in the drawings. The invention is capable of other embodiments and of being practiced or of being carried out in various ways. Also, the phraseology and terminology used herein is for the purpose of description and should not be regarded as limiting. The use of the terms "including," "comprising," "having," "containing," "involving," and variations thereof herein, is meant to encompass the items listed thereafter and equivalents thereof as well as additional items.

FIG. 1 is block diagram of an exemplary embodiment of a multilayer injection molding apparatus 100 having a control system 150 to provide automatic process control according to aspects of the present invention. In apparatus 100, first material 102a and a second material 102b are provided to an injection apparatus 110 that produces a molten output including the first material and the second material. The molten output is provided to a mold 120 containing one or more cavities (e.g., 48 or 144 cavities). Mold 120 comprises a hot half of a mold 122 for introducing the molten material into the cavities, and a cold half 124 of the mold which solidifies the molten layered materials in the cavity and ejects a molded product into a secondary cooling device (not shown). The temperatures of various zones of the hot half 122 are controlled by a temperature controller 130 to control the features of the molded product such as a position of a leading edge of a core material, thickness of the core material, and permeability of the product to gas and/or light. The core material is comprised of one of materials 102a and 102b mentioned above.

According to aspects of the present invention, control system 150 forms a closed loop capable of adjusting one or more parameters of mold 120. For example, control system 150 may alter injection apparatus 110 and/or hot half 122, and thereby effecting a change in one or more features of the molded products. Control system 150 comprises an inspection device 170 to measure molded products from the mold 120, and a controller 160 to adjust one or more parameters of mold 120.

Materials 102a and 102b may be any materials suitable for use in an injection molding system. For example, the two materials may be distinct polymer compounds or they may be the same polymer compounds, one having a different quality grade or a different color dye additive. In some embodiments, the materials are selected for use as blow molding preforms and therefore, in such embodiments, the materials should also be suitable for subsequent blow molding. For example, skin materials may be polyethylene terephtholate (PET) or Polypropylene (PP) and core materials may be ethylene vinyl alcohol copolymer (EVOH) or polyamide (Nylon MXD6).

Injection apparatus 110 may be any injection apparatus suitable for injecting materials 102a and 102a into mold 120. Injection apparatus 110 applies heat to achieve a molten state of materials 102a and 102b, and is capable of applying a suitable amount of pressure to inject the materials into mold 120. Injection apparatus 110 is described in greater detail below with reference to FIG. 2.

Mold 120 may be any presently known or subsequently developed mold that is suitable for injection molding. For example, hot half 122 may be based on shooting pot technologies or thermally-balanced injection technologies. One example of a hot half that is based on thermally-balanced technologies is described in greater detail with reference FIG. 2, below. Cold half 124 may be any presently known or subsequently developed cold half suitable for use in an injection molding apparatus as described herein.

As is known in the art, the temperatures of various regions of hot half 122 may be determined by selecting a target temperature for each of one or more zones of hot half 122. For example, target temperature may be achieved and/or maintained by temperature controller 130 using conventional, closed-loop control system techniques such as proportional-integral-differential control techniques (PID) or $PID^2$.

According to aspects of the present invention, target temperatures are selected based on characteristics of mold products as measured by inspection device 170. The measured characteristics are processed by a calculation module 162 in controller 160, and controller adjusts one or more parameters of injection apparatus 110 or hot half 122 (e.g., the target temperatures) to effect a change in one or more characteristics of the mold products. In a multiple cavity system, control may be achieved by measuring all products (i.e., each product from each cavity) or using SPC techniques in which the number of products measured and the frequency with which the products from each cavity are measured are determined by applying standard techniques.

Inspection device 170 may be any suitable device for measuring a selected product feature (e.g., position of the leading edge of the core layer, trailing edge of the core layer, core layer volume and/or core layer thickness, permeability to gas or light). Suitable measurement techniques include, but are not limited to optical techniques, ultrasound techniques, magnetic resonance techniques, gas pressurization devices. Examples of suitable inspection devices are described in greater detail below with reference to FIGS. 7A-B.

Inspection device 170 may comprise a single measurement device (e.g., single optical device) operating at a relatively high speed. Alternatively, inspection device 170 may comprise a plurality of measurement devices (e.g., a number of optical devices equal to the number of cavities) thus requiring a relatively lower speed of operation per part.

In embodiments of injection systems having multiple cavities, it is typically desirable that a product measured by inspection device 170 be from an identified cavity within mold 120 so that appropriate adjustments to parameters affecting the cavity may be made. Any suitable sorting apparatus 175 employing a suitable technique for organizing or identifying the products may be employed, such that a product measured by inspection device 170 is from an identified cavity. For example, a combination of chutes may be employed such that a given chute receives a product from a corresponding cavity and aligns the products in a selected order on a conveyor belt. Alternatively, the mold 120 may be capable of tipping in a manner that lays the products on a surface in a predetermined arrangement without the use of a sorting apparatus. Yet another alternative is to suitably mark the products from cavities such that marking is detectable. For example, a barcode or other indicia can be formed on the products during molding.

In some embodiments, an acceptance/rejection device 180 (also referred to herein as a rejection device) may operate to remove a product if a characteristic measured by inspection device 170 is outside of a predetermined range for the product or after an uncertainty as to the quality of products being produced occurs (e.g., statistical process control calculations indicate that too high of a percentage of products may be outside of the range). In some embodiments, products may be rejected for a selected period of time or a selected number of molding cycles after a product that is out of specification is measured. The period of time or selected number of molding cycles allows a level of confidence (that the products are in specification) to be established. The acceptance/rejection device may operate using any suitable technique to identify and/or physically separate a rejected product(s) from accepted product(s). For example, a mechanical arm may push a rejected part into a recycle bin.

Figure 2:
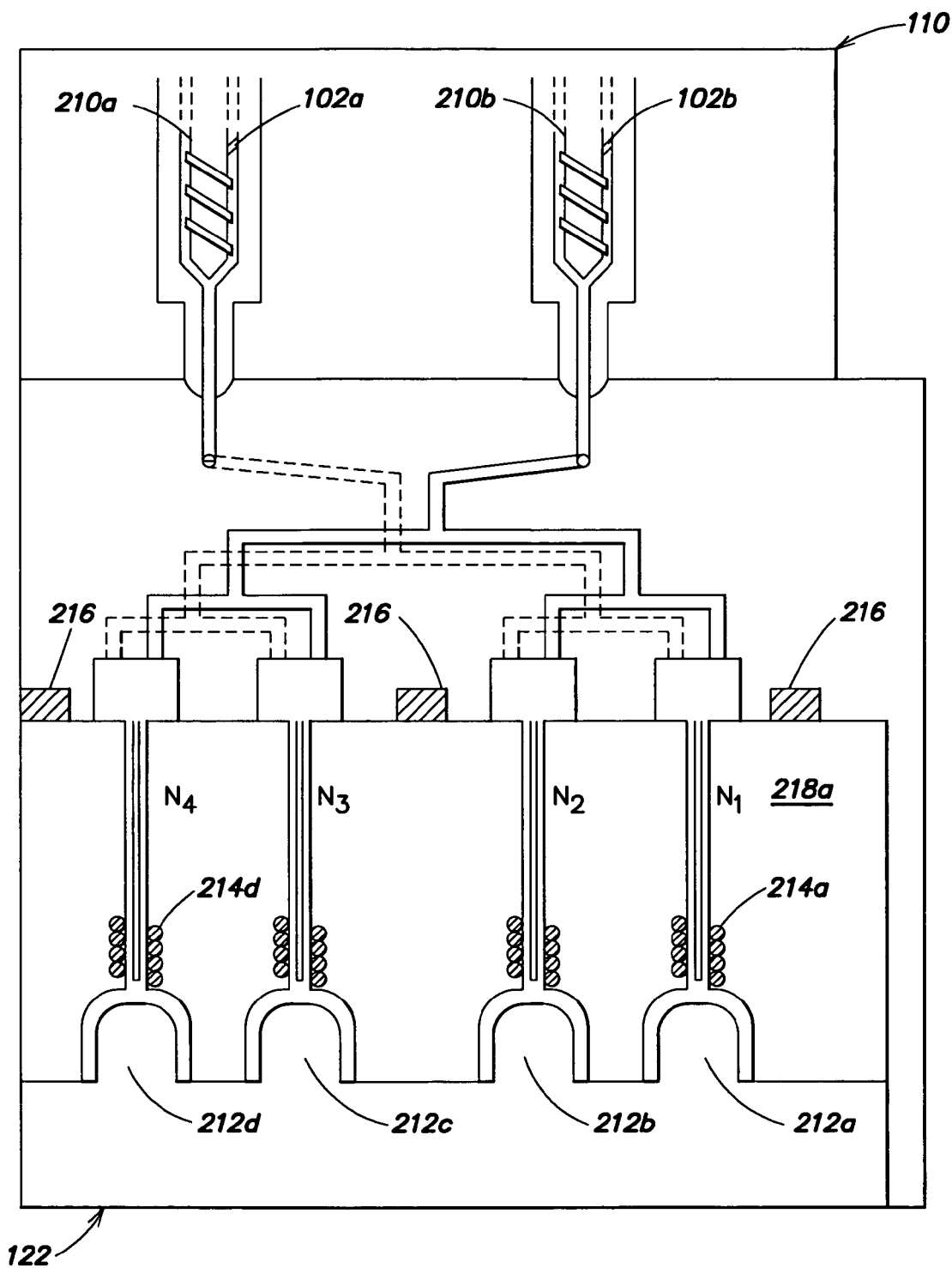
FIG. 2 is a schematic illustration of an exemplary injection apparatus, and a hot half of a mold.

FIG. 2 is a schematic illustration of an exemplary embodiment of an injection apparatus 110 and a hot half of a mold 122. First material 102a and second material 102b are introduced into mold 120 by injection apparatus 110, where the materials are combined and subsequently introduced into cavities 212a-212d for molding.

Injection apparatus 110 includes injection screws 210a and 210b which inject the first material and the second material into a cavity. The timing of the operation of the screws affects the location and dimension of a core layer and/or skin layer of a molded product of cavities 212a-212d. As described in greater detail in U.S. Pat. No. 5,914,138, titled "APPARATUS FOR THROTTLE-VALVING CONTROL FOR THE CO-EXTRUSTION OF PLASTIC MATERIALS AS INTERIOR CORE STREAMS ENCASED BY OUTER AND INNER STREAMS FOR MOLDING AND THE LIKE," to Swenson, (referred to herein as "Swenson") the substance of which is incorporated by reference herein, the start time of a stroke, stroke speed and stroke distance affect the location and dimension of core and/or skin material of a multilayer product. The screws are typically servo-controlled. One or more of a temperature of the injection apparatus, a pressure or rate with which material is injected into a cavity by the injection apparatus, and the timing of the injection of the material may be controlled by control system 150 in response to a measured characteristic.

Hot half 122 is illustrated as having two manifolds feeding four nozzles $N_1$-$N_4$. However, the invention is not so limited and any suitable number of manifolds and nozzles may be present. The temperature of individual nozzles N may be set using heaters 214a-214d. The temperature of block 218a may be individually controlled using heaters 216. Accordingly the temperature of the molten material entering a cavity 212 from nozzles N in a selected manifold may be controlled in unison by heaters 216, in addition to individually controlling nozzle temperatures using heaters 214.

As is known in the art, the location of a core layer and/or skin layer may be selected by varying the temperatures of any of the heaters 214 and 216.

Figure 3:
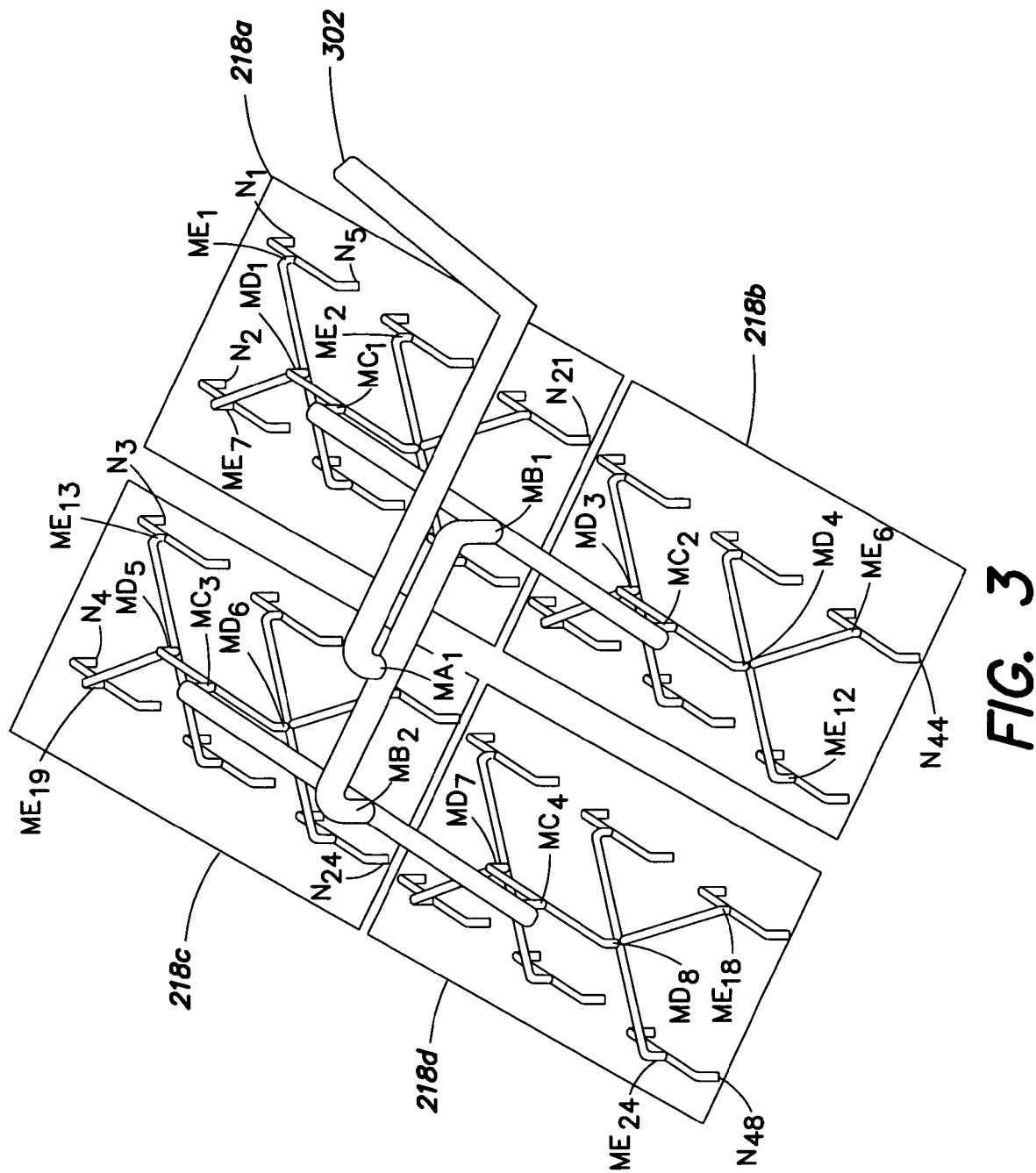
FIG. 3 is a schematic illustration of an exemplary embodiment of a runner layout and heater scheme for a single material of a multilayer injection molding apparatus.

FIG. 3 is a schematic illustration of an exemplary embodiment of a runner layout and heater scheme for first material 102a (shown in FIG. 1). First material 102a is received in molten form from injection apparatus 110 (shown in FIG. 1) at input 302. In the illustrated exemplary embodiment, there are forty-eight nozzles $N_1$-$N_{48}$. The nozzles N are connected to input 302 by a hierarchy of manifolds MA1, MB1-MB2, MC1-MC4, MD1-MD8, and ME1-ME24. As described above with reference to FIG. 2, in some embodiments, each nozzle N has a corresponding heater 214.

As described above with reference to FIG. 2, nozzle heaters 214 may be used to heat nozzles in a given heater block to individually selected temperatures. Additionally, groups of runner branches may be heated by a single block 218a-d, each having one or more heaters 216 (shown in FIG. 2), such that heat from a single block heats the branches within the block the same amount. In the illustrated embodiment, the number of nozzles, the number of blocks, the branching of the manifolds, and the heating layout have been selected merely for illustrative purposes and are not limiting of the invention.

Figure 4:
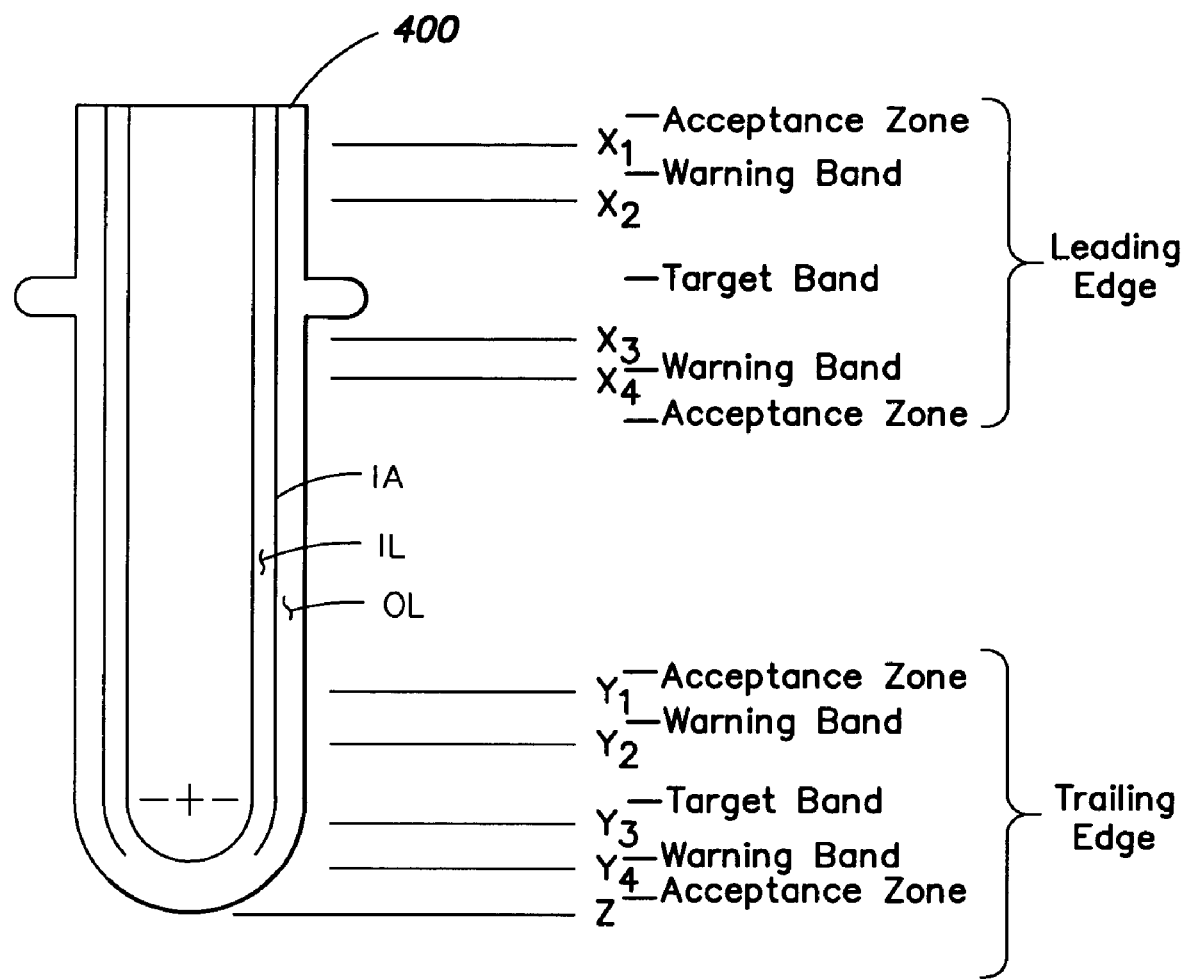
FIG. 4 illustrates an exemplary mold product from a cavity corresponding to one of nozzles $N_i$ (shown in FIG. 3)

FIG. 4 illustrates an exemplary mold product 400 from a cavity corresponding to one of nozzles $N_i$ (shown in FIG. 3). The exemplary product has three layers: an inner layer IL consisting of skin material, an outer layer OL consisting of skin material, and an interior annular layer IA (also referred to herein as a core layer) consisting of core material. It is to be appreciated that the core layer may not be coextensive with the inner layer and outer layer OL (i.e., it may not extend as far as the inner layer and/or outer layer in either or both the leading edge or the trailing edge of the product). Although the illustrated product is a three layer structure, the invention is not so limited and a multilayer product having two or more layers may be used.

As one of ordinary skill in the art would understand, the position of interior annular layer IA within product 400 is affected, for example, by the beginning time of the stroke of the screw injecting core material relative to the stroke of the screw injecting the skin material (shown in FIG. 2), as well as the temperature of the skin material flow channels leading to that particular cavity as determined by any of heaters 214 and 216 (shown in FIG. 2). The position of trailing edge of the core layer in product 400 is determined by the end of core material injection relative to the injection of the skin material and can be adjusted by changing the core material shot size or screw 210 velocity or the skin injection velocity (shown in FIG. 2), and thickness of the core is determined by the volumetric flow ratio of the volumetric flow rate of core material to the volumetric flow rate of the skin material. The volumetric flow ratio can be controlled by changing the injection velocity of the core or skin injection units.

Exemplary characteristics of mold products, which may be used to evaluate the acceptability of mold products and to control an injection molding apparatus according to the present invention, include the following:

a location of a leading edge of the core; including whether the leading edge is located at a target position;

a location of a trailing edge position of the core; including whether the trailing edge is located at a target position;

an acceptance zone for the leading edge of the core, having a maximum position $X_1$ and a minimum position $X_4$; if a leading edge is located outside of said zone a product is rejected;

an acceptance zone for the trailing edge of the core, having a maximum position $Y_4$ and a minimum position $Y_1$; if a trailing edge is located outside of said zone a product is rejected;

a warning band for the leading edge of the core, having a maximum position $X_2$ and a minimum position $X_3$; if a leading edge is located outside of said band corrective action is taken by a control system 150 (shown in FIG. 1), for example, in the manner described below with reference to FIG. 6; and a warning band for the trailing edge of the core, having a maximum position $Y_3$ and a minimum position $Y_2$; if a trailing edge is located outside of said band corrective action is taken by a control system 150 in the manner described below.

The above characteristics may be used to determine if and/or when a product is acceptable. For example, for a given product, a measurement to determine the presence of the core layer may be made at the bottom of the leading edge acceptance zone $X_4$, and a measurement may be made to determine the presence of the core layer at the top of the acceptance zone $Y_1$. If the core is determined to be present at both locations the produce may be determined to be acceptable.

The above characteristics are merely exemplary and were chosen for the sake of illustration. Any characteristic or combination of characteristics capable of measurement by inspection device 170 in FIG. 1 may be used.

Any suitable measurable characteristic may be used to perform process control according to aspects of the present invention. For example, in addition to the core position, core thickness, core volume, gas permeability and/or light permeability may be used. The characteristic used to perform process control may be measured directly by inspection device 170 or calculated from a directly measured value. For example, gas or light permeability may be calculated from an a priori knowledge of the materials used to form the product and measured thicknesses. Additionally, the characteristic used to control a system may correspond to a characteristic measured at a selected point on a first product 400 or an average value calculated from sampled values from a single product 400 or an average value calculated from plurality products from a single cavity or a plurality of cavities. While it is to be appreciated that if multiple products from a single cavity are to be measured, the products will necessarily be produced over multiple molding cycles, it is also to be appreciated that if multiple products from a plurality of cavities are to be measured, the products may be produced over one or more molding cycles.

According to aspects of the present invention, controller 160 may be any controller suitable for achieving products from a mold having selected characteristics or suitable for maintaining a system producing products having characteristics in a selected range. For example, the selected range may be an acceptance zone as described above with reference to FIG. 4.

According to some embodiments, one or more characteristics of the products of one or more cavities of an injection molding apparatus are measured and provided to a controller. In response to the measured characteristic, the controller executes an algorithm and adjusts one or more parameters of the injection molding apparatus to attain products having characteristics in a selected range.

It is to be appreciated that adjusting a selected parameter may have an impact (i.e., a secondary effect) on one or more other parameters. For example, in a system having a plurality of cavities fed by a plurality of nozzles, the characteristics of molded products of a first cavity may be affected by parameters associated with a second cavity. One example of such an interrelationship is provided by an injection mold system connected by a manifold hierarchy, such as the system above with reference to FIG. 2 and FIG. 3. In such a system, the temperature of a nozzle corresponding to a first cavity may affect the flow of core material to a second cavity, thereby affecting the core layer leading edge of a product from the second cavity.

Accordingly, in some embodiments, at least one characteristic of a product of a first cavity of an injection molding apparatus is measured and provided to a controller. In response to the measured characteristic, the controller executes an algorithm and adjusts one or more parameters of the first cavity of the injection molding apparatus to attain products of the first cavity having characteristics in a selected range. By applying this technique, the automatic control of injection molding apparatus may be achieved. Additionally, during one or more subsequent molding cycles (i.e., iterations), characteristics of other cavities may be measured and adjusted to attain products having characteristics in the selected range and thereby compensate for secondary effects.

In other embodiments, at least one characteristic of a product of a first cavity of an injection molding apparatus may be measured and provided to a controller. In response to the measured characteristic, the controller executes an algorithm and adjusts the parameters of the first cavity and the parameters of at least a second cavity during a single molding cycle. Accordingly, in such embodiments, the parameters of other cavities may be adjusted during the same cycle to accommodate for the effects on the other cavities resulting from the change in the parameter of the first cavity (i.e., secondary effects). Accordingly, in such embodiments, it may be possible to reduce the number of iterations to attain products having characteristics in the selected range for all cavities of a multicavity molding apparatus. FIG. 5 illustrates an exemplary affect matrix A for use in an exemplary embodiment of such a system.

The exemplary affect matrix illustrated in FIG. 5 illustrates the relationship between nozzle temperatures and the movement of the leading edges of the core layers in a multicavity system. The affect matrix is related to nozzle temperatures and core layer leading edge positions in the following manner.

$$Ax = b$$

where x is a 1 by n matrix having elements each indicating the change in temperature of a nozzle at a corresponding cavity 1 through n; b is a 1 by n matrix having elements each indicating the movement of the position of the core layer leading edge of a product in a corresponding cavity 1 through n; and A is an n by n affect matrix illustrating the effect of a selected change in a temperature of a given nozzle on the core layer leading edge in a selected cavity (e.g., $A_{Ni,Pi}$ indicates the effect of a temperature change of nozzle $N_i$ at cavity i on the core leading edge of the molded product produced at cavity j).

Referring to FIG. 3, it is to be appreciated the values of the affect matrix are determined at least in part by the position of a nozzle whose temperature is to be changed, relative to the remaining nozzles upon which the temperature change has a secondary effect. In the layout illustrated in FIG. 3, a change in the temperature of nozzle $N_1$ would most directly impact core layer position of nozzle $N_5$, with which it shares manifolds ME1, MD1, MC1, MB1, and MA1. By contrast, since each of nozzles in heater blocks 218*c* and 218*d* are each related to nozzle $N_1$ through manifold MA, the relationship between the change of temperature in nozzle $N_1$ and the position of the leading edge of core layers from nozzles in heater blocks 218*c* and 218*d* would be relatively weak and equal in magnitude.

In one embodiment of the invention, a temperature change to occur in a given nozzle is determined by the location of core layer leading edge position as measured by inspection device 170 (shown in FIG. 1) relative to the target band (illustrated in FIG. 4). The temperature changes necessary to effect the desired movement in the location of the position of the core layer leading edge are determined by multiplying matrix b by an inverted form of affect matrix A (referred to as $A^{-1}$) in the following manner.

$$x = A^{-1} b$$

The resulting temperature values can be provided to temperature controller 130 using conventional techniques. Accordingly, by applying this technique iteratively, the automatic control of injection molding apparatus may be achieved.

In some embodiments, during the process of temperature adjustment according to the above technique, the temperatures of the nozzles may be occasionally measured directly. For example, occasional temperature measurements may be useful to avoid runaway temperatures which may occur as a result of multiple successive molding cycles during which cavity temperatures are increased to control the relative flow of materials into the cavities. In such situations, while the desired movements of the leading edge may be obtained due to maintenance of the proper relative nozzle temperatures, the absolute temperatures of one or more nozzles may become excessively high. Accordingly, if the each sum of the temperatures of the nozzles exceeds a predetermined value, each of the temperatures of each of the nozzles may be decreased by a selected amount (e.g., 1° C.). Alternatively, matrix $A^{-1}$ may be selected (e.g., normalized) such that the sum of the changes of the temperatures of the nozzles during any iteration of temperature changes is substantially equal to zero (i.e., after any iteration in which the nozzle temperatures are changed, the average of the nozzle temperatures is substantially unchanged.)

While the above exemplary control system controlled the injection molding apparatus by measuring only core layer leading edge values, any suitable measurable characteristic may be used to control the apparatus. A suitable affect matrix may be calculated to control the measured characteristic. Additionally, in some embodiments, multiple characteristics may be used to control the system. In some embodiments, in which multiple characteristics are controlled, the control may be based on a weighted evaluation of the characteristics.

It is to be appreciated that the values placed in an affect matrix will vary according to specific injection molding apparatus used, and may vary according to specific units having the same model number. The values in the affect matrix may be determined theoretically or empirically.

Figure 6:
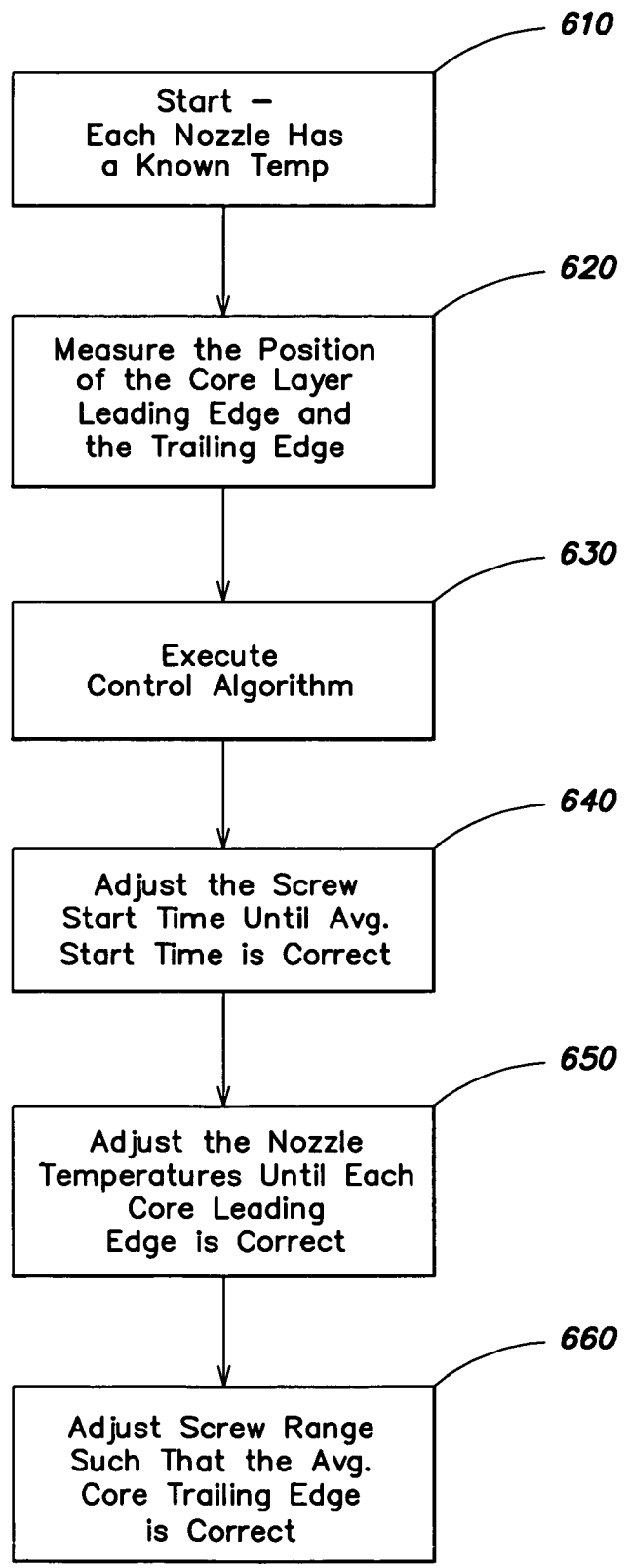
FIG. 6 is a flow chart illustrating one example of algorithm suitable for positioning the leading edges and trailing edges of the products from cavities of a multilayer injection device having at least one cavity.

FIG. 6 depicts a flow chart of one example of a process suitable for positioning the leading edges and trailing edges of the products from cavities of a multilayer injection device having at least one cavity.

At step 610, the nozzle heaters for each cavity are measured or are otherwise set to a known temperature. At step 620, the core layer leading edge and the core layer trailing edge of products from each cavity are measured. At step 630, a control algorithm is executed. For example, the measured positions of the leading edges and the trailing edges are compared to the selected ranges of leading edge position and trailing edge position. The deviations from the selected ranges are used to determine the amount by which temperatures of one or more cavities are to be adjusted to attain products having characteristics in the selected range. For example, one or more nozzle temperatures are adjusted independently or an affect matrix is applied to adjust a plurality of temperatures as described above.

At step 640, the start time of the screw 210a injecting the core material (shown in FIG. 2) is adjusted such that the average core layer leading edge is properly located. At step 650, the nozzle heater temperatures are individually adjusted so that core layer leading edge of the products from the individual cavities are properly positioned. At step 660, the stroke range of screw 210a is adjusted such that the average of the core layer trailing edges for each product are set to the target value.

It is to be appreciated that a control system as described herein may operate as an expert system. For example, if an inspection device measures parameters during a selected temperature cycle or over a selected series of cycles, the system may take selected actions or may indicate to an operator (e.g. using any suitable audio, visual or tactile technique) that a selected problem should be checked. For example, if the edge of a core layer is determined to deviate from a target value in a certain manner, it may be indicative that the material has excessive moisture present. Accordingly, the operator can be signaled in an appropriate manner and appropriate testing may be performed. In some embodiments, a trend is identified and the operator is signaled prior to the production of products that our outside of the acceptable range.

An expert system according to aspects of the present invention may shut down a cavity (e.g., by reducing the nozzle temperature of the cavity so as to freeze the material flowing through the nozzle). For example, a cavity may be shut down if the product from the cavity was outside of an acceptable range for a selected number of molding cycles. In some embodiments, a known set of actions may be taken by an injection molding system if a cavity is shut down. For example, to compensate for the nozzle that was shut down, the temperatures of selected nozzles may be changed by a given amount, and the stroke distance of the screw may be reduced by a selected amount to compensate for lack of flow of molten material from the nozzle that was shut down. An affect matrix may be applied to compensate for shutting a nozzle down.

In some embodiments of injection molding systems according to the present invention, a control system 150 (shown in FIG. 1) may be configured to have a learning mode. For example, the control system 150 may be placed in a learning mode and one or more identified components of the system may be varied, such that the control system records a trend in one or more characteristics of the products produced that are measured by inspection device 180.

For example, the moisture content of the core material feeding the injection molding apparatus may be increased. During the increase in core material moisture content, the position of the leading edges of the products is measured and the standard deviation or other suitable statistic(s) are recorded. Subsequently, when the injection molding system is used to produce products, the positions of the leading edges can be monitored by controller 162 to determine if a statistical trend similar to that resulted from the increase in core material moisture content is occurring. If such a trend were occurring, the operator may be alerted to the existence of a potential moisture problem, and proper actions may be taken.

Figure 7A:
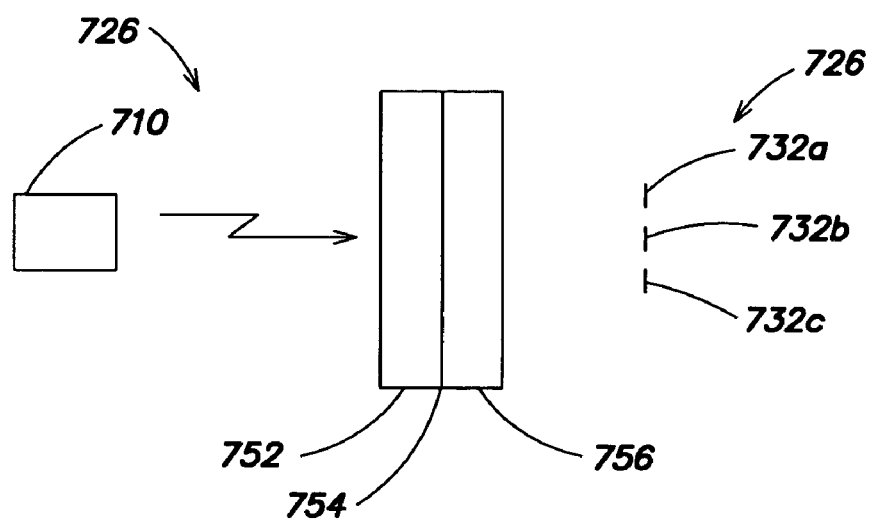
FIGS. 7A-7B are schematic illustrations of exemplary embodiments of inspection devices according to aspects of the invention.

FIG. 7A is an exemplary embodiment of a light permeability inspection device 726 suitable for use in aspects of the present invention. Light permeability device 726 comprises light source 710, such as a white light source, and photodetectors 732a-c. For example, assuming that skin layers 752 and 756 are made of the same material, a first photodetector 732a is selected such that detects a first wavelength that is absorbed to a greater degree by core layer 754 than skin layers 752 and 756; a second photodetector 732b is selected such that it detects a second wavelength that is absorbed to a greater degree by skin layers 752 and 756 than core layer 754; and a third photodetector is selected which detects a third wavelength which is substantially not absorbed by any of layers 752, 754 and 756. As one of ordinary skill would understand, by having an a prior knowledge of the absorption per unit length at each of detected wavelengths, for each of the core layer material and the skin layer material, it is possible for a controller (such as controller 160 in FIG. 1) to calculate a thickness of the core layer and a combined thickness of the skin layers. Additionally, if the source and detectors are translated along the length of the product, the presence of the skin layer and/or the location of the edges of the core layer may be determined.

Figure 7B:
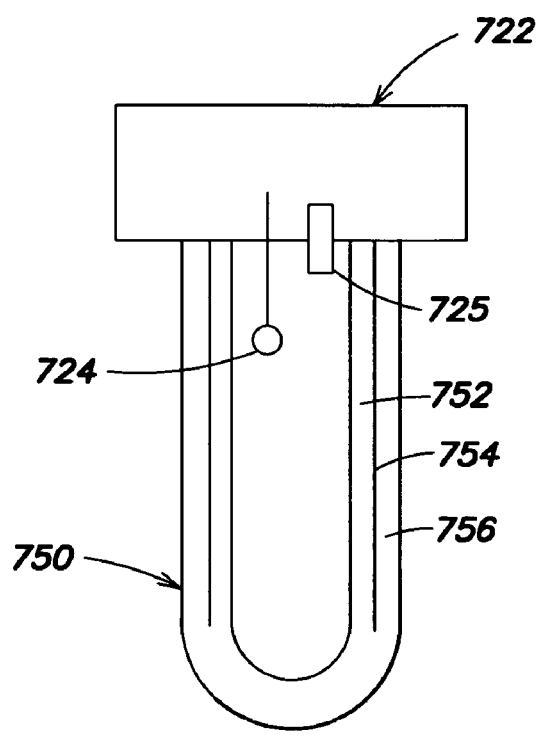

FIG. 7B is a side view of an exemplary embodiment of a gas permeability inspection device 722. Gas permeability apparatus 722 comprises an apparatus for introducing pressurized gas 725 into molded product 750, and a pressure sensor 724. It is to be product 750, and determining the pressure over time gas permeability may be determined. For. example, if gas permeability were determined to be insufficient the thickness of core layer 754 may be increased. Another example of an inspection device capable of measuring thicknesses is an ultrasound device as described in U.S. patent application Ser. No. 10/828,389, filed Apr. 19, 2004, titled METHOD AND APPARATUS FOR MULTILAYER THICKNESS MEASUREMENT, to Sabin, et al. The substance of said application is incorporated by reference in its entirety. Other measurement devices may measure weight and/or density of products to provide feedback for controlling a molding device.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A method of operating a molding device having at least one cavity, comprising:
    measuring at least one characteristic of a first molded product from a first injection of material into a first cavity of the at least one cavity;
    measuring at least one characteristic of a second molded product from a second injection of material into the first cavity;
    calculating a parameter based on the at least one characteristic of the first molded product and the at least one characteristic of the second molded product;
    modifying, based at least in part on the parameter, the molding device; and
    after modifying the molding device, producing a third molded product, whereby the third molded product is different than it would have been before modifying.

2. The method of claim 1, wherein the third molded product is produced by the first cavity.

3. The method of claim 1, wherein modifying the molding device comprises controlling a temperature of a hot half constituting a portion of said at least one cavity.

4. The method of claim 3, wherein modifying the molding device comprises controlling a temperature of a nozzle constituting a portion of the hot half.

5. The method of claim 4, wherein the hot half comprises at least one block which is thermally coupled to the nozzle, and wherein modifying the molding device comprises controlling a temperature of the at least one block.

6. The method of claim 1, wherein modifying the molding device comprises controlling an injection apparatus constituting a portion of said molding apparatus.

7. The method of claim 6, wherein the injection apparatus includes an injection screw and wherein modifying the molding device includes controlling the injection screw.

8. The method of claim 6, wherein modifying the molding device includes controlling at least one of a temperature of the injection apparatus, controlling timing of injection of a material into the at least one cavity, controlling a rate at which the material is injected into the at least one cavity and controlling a pressure at which the material is injected into the at least one cavity.

9. The method of claim 1, wherein the first molded product comprises a first multi-layer molded product, and wherein measuring at least one characteristic of the first multi-layer molded product comprises measuring a characteristic of a core layer of the first multi-layer molded product.

10. The method of claim 9, wherein the first molded product comprises a first multi-layer molded product, and wherein measuring at least one characteristic of the first multi-layer molded product includes one of determining a location of the core layer, and determining a presence of the core layer.

11. The method of claim 1, further comprising measuring at least one characteristic of the second molded product using an inspection device.

12. The method of claim 1, further comprising physically altering the first molded product after it has been determined to be outside of a specification.

13. The method of claim 1, further comprising physically moving the first molded product after it has been determined to be outside of a specification.

14. The method of claim 1, wherein the parameter is an average of said at least one characteristic of the first molded product and said at least one characteristic of the second molded product.

15. The method of claim 1, further comprising processing the at least one characteristic of the first molded product using an affect matrix to produce an output, wherein modifying the molding device is based at least in part on the output.

16. The method of claim 1, further comprising indicating to an operator that based on the at least one characteristic a selected action is to be taken by the operator.

17. The method of claim 1, wherein at least one of the first, second, and third molded products comprises a multilayered molded product, and wherein the second injection of material into the first cavity is subsequent to the first injection of material into the first cavity.

18. A control system for use with a molding device having at least one cavity, comprising:
    an inspection device adapted to measure at least one characteristic of a first molded product from a first injection of material into a first cavity of the at least one cavity;
    the inspection device adapted to measure at least one characteristic of a second molded product from a second injection of material into the first cavity; and
    a controller configured and arranged to calculate a parameter based on the at least one characteristic of the first molded product and the at least one characteristic of the second molded product, and to modify the molding device based at least in part on the parameter, whereby at least one characteristic of a third molded product produced after modification is different than it would have been before the modification.

19. The control system of claim 18, wherein the third molded product is from a third injection of material into the first cavity.

20. The control system of claim 18, wherein the controller is adapted to be coupled to a hot half of the at least one cavity and to control a temperature of the hot half, whereby the at least one characteristic of the third molded product is altered.

21. The control system of claim 20, wherein the hot half comprises at least a first nozzle, and wherein the controller is adapted to control a temperature of the first nozzle.

22. The control system of claim 20, wherein the hot half comprises at least one block which is thermally coupled to a plurality of nozzles, and wherein the controller is adapted to control a temperature of the at least one block.

23. The control system of claim 20, further comprising a temperature controller coupled intermediate to the controller and the hot half to control the temperature of the hot half.

24. The control system of claim 18, wherein the molding device includes an injection apparatus adapted to inject the material into the at least one cavity and wherein the controller is adapted to be coupled to the injection apparatus.

25. The control system of claim 24, wherein the injection apparatus includes an injection screw and wherein the controller is adapted to control the injection screw.

26. The control system of claim 24, wherein the controller is adapted to control at least one of a temperature of the injection apparatus, timing of injection of the material, rate at which the material is injected and pressure at which the material is injected.

27. The control system of claim 18, wherein the control system is adapted for use with a thermally-balanced molding device.

28. The control system of claim 18, wherein the control system is adapted for use with a shooting pot-based molding device.

29. The control system of claim 18, wherein the characteristic of the first molded product includes a characteristic of a core layer.

30. The control system of claim 29, wherein the characteristic of the core layer is one of a location of the core layer, and presence of the core layer.

31. The control system of claim 18, wherein the inspection device is one of an optical device, an ultrasound device and a magnetic resonance imaging device.

32. The control system of claim 18, further comprising a rejection device coupled to the controller device, and the controller is adapted to activate the rejection device if the first molded product is determined to be outside of a specification or a selected level of uncertainty.

33. The control system of claim 32, wherein the rejection device is adapted to physically alter the first molded product if the first molded product is determined to be outside of the specification.

34. The control system of claim 32, wherein the rejection device is adapted to physically move the first molded product if the first molded product is determined to be outside of the specification.

35. The control system of claim 18, wherein the parameter corresponds to at least one characteristic of a plurality of multi-layer molded products, the first molded product constituting one of said plurality.

36. The control system of claim 18, wherein the controller is configured and arranged to control the at least one characteristic of the third molded product in response to an affect matrix applied to the parameter.

37. The control system of claim 18, wherein the controller is configured to indicate to an operator that, based on the information, a selected action is to be taken by the operator.

38. The control system of claim 21, further comprising a second cavity operatively coupled to a second nozzle, wherein the controller is configured to shut down the second cavity and to modify the temperature of the first cavity in response to said shut down.

39. The control system of claim 18, wherein the inspection device comprises a first inspection device adapted to measure at least one characteristic of the first molded product and a second inspection device adapted to measure at least one characteristic of the second molded product.

40. The control system of claim 24, wherein the first, second, and third molded products are formed from subsequent injections of the material into the first cavity.

41. The control system of claim 24, wherein the first and second molded products are formed from subsequent injections of the material into the first cavity, and wherein at least one intervening molded product is formed in the first cavity between formation of the second and third molded products.

42. The control system of claim 24, wherein at least one intervening molded product is formed in the first cavity between formation of each of the first, second, and third molded products.

43. A control system for use with a molding device having a plurality of cavities, comprising:
  an inspection device adapted to measure a characteristic of a first molded product from a first injection of material into one of the plurality of cavities;
  the inspection device adapted to measure a characteristic of a second molded product from a second injection of material into one of the plurality of cavities; and
  a controller configured and arranged to calculate a parameter based on the characteristic of the first molded product and the characteristic of the second molded product, and to modify the molding device based at least in part on the parameter, whereby a characteristic of a third molded product produced after modification from a third injection of material into one of the plurality of cavities is different than it would have been before the modification.

44. The control system of claim 43, wherein the first and second molded products are formed from different cavities of the plurality of cavities.

45. The control system of claim 43, wherein the third injection is subsequent to the second injection, and wherein the second injection is subsequent to the first injection.

46. The control system of claim 45, comprising:
  one or more intervening injections of material into one of the plurality of cavities between at least one of the first, second, and third injections.

* * * * *

UNITED STATES PATENT AND TRADEMARK OFFICE
CERTIFICATE OF CORRECTION

| | |
|---|---|
| PATENT NO. | : 7,517,480 B2 |
| APPLICATION NO. | : 10/920725 |
| DATED | : April 14, 2009 |
| INVENTOR(S) | : Douglas Sabin and Paul Swenson |

It is certified that error appears in the above-identified patent and that said Letters Patent is hereby corrected as shown below:

Replace the paragraph beginning at column 13, line 11 with the following paragraph:

FIG. 7B is a side view of an exemplary embodiment of a gas permeability inspection device 722. Gas permeability apparatus 722 comprises an apparatus for introducing pressurized gas 725 into molded product 750, and a pressure sensor 724. It is to be appreciated that although product 750 is illustrated as cylindrical, it may have any suitable shape. For example product 750 may be flat and apparatus 726 may be suitably configured to apply pressured gas to the flat product. In some embodiments, by introducing pressurized gas into the product 750, and determining the pressure over time gas permeability may be determined. For example, if gas permeability were determined to be insufficient the thickness of core layer 754 may be increased. Another example of an inspection device capable of measuring thicknesses is an ultrasound device as described in U.S. patent application Ser. No. 10/828,389, filed Apr. 19, 2004, titled METHOD AND APPARATUS FOR MULTILAYER THICKNESS MEASUREMENT, to Sabin, et al. The substance of said application is incorporated by reference in its entirety. Other measurement devices may measure weight and/or density of products to provide feedback for controlling a molding device.

Signed and Sealed this

Eighth Day of September, 2009

David J. Kappos
*Director of the United States Patent and Trademark Office*